(12) United States Patent
Miranda et al.

(10) Patent No.: US 10,808,682 B2
(45) Date of Patent: Oct. 20, 2020

(54) WIND TURBINE SYSTEM WITH TIME DISTRIBUTED TRANSITIONS

(71) Applicant: VESTAS WIND SYSTEMS A/S, Aarhus N (DK)

(72) Inventors: Erik Carl Lehnskov Miranda, Randers (DK); Jacob Deleuran Grunnet, Tranbjerg J (DK); Damien Castaignet, Hamburg (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 182 days.

(21) Appl. No.: 16/063,576

(22) PCT Filed: Dec. 12, 2016

(86) PCT No.: PCT/DK2016/050427
§ 371 (c)(1),
(2) Date: Jun. 18, 2018

(87) PCT Pub. No.: WO2017/108047
PCT Pub. Date: Jun. 29, 2017

(65) Prior Publication Data
US 2019/0003457 A1    Jan. 3, 2019

(30) Foreign Application Priority Data
Dec. 22, 2015    (DK) ................... 2015 70849

(51) Int. Cl.
*F03D 7/02* (2006.01)
*F03D 7/04* (2006.01)
*F03D 1/02* (2006.01)

(52) U.S. Cl.
CPC ............... *F03D 7/042* (2013.01); *F03D 1/02* (2013.01); *F03D 7/026* (2013.01); *F03D 7/0224* (2013.01);
(Continued)

(58) Field of Classification Search
CPC .......... F03D 7/042; F03D 1/02; F03D 7/0224; F03D 7/026; F03D 7/0264; F05B 2260/74
See application file for complete search history.

(56) References Cited

U.S. PATENT DOCUMENTS

| | | | | |
|---|---|---|---|---|
| 5,876,181 A | * | 3/1999 | Shin | F03D 1/06 415/2.1 |
| 8,931,235 B2 | * | 1/2015 | Baker | F03D 1/04 52/745.17 |

(Continued)

FOREIGN PATENT DOCUMENTS

| | | |
|---|---|---|
| CN | 101680426 A | 3/2010 |
| CN | 104011378 A | 8/2014 |

(Continued)

OTHER PUBLICATIONS

Chinese Office Action for Application No. 201680075146.X dated May 23, 2019.

(Continued)

*Primary Examiner* — Aaron R Eastman
*Assistant Examiner* — Theodore C Ribadeneyra
(74) *Attorney, Agent, or Firm* — Patterson + Sheridan, LLP

(57) ABSTRACT

There is presented a wind turbine system, wherein the wind turbine system is comprising a support structure, a plurality of wind turbine modules mounted to the support structure wherein each of the plurality of wind turbine modules comprises a rotor, and wherein the wind turbine system further comprises a control system, wherein the control is arranged to execute a wind turbine system transition from a first system operational state of the wind turbine system to a second system operational state of the wind turbine system, and wherein the wind turbine system transition is performed by executing a plurality of wind turbine module transitions from a first module operational state of a wind (Continued)

turbine module to a second module operational state of the wind turbine module wherein the plurality of wind turbine module transitions are distributed in time with respect to each other.

13 Claims, 5 Drawing Sheets

(52) U.S. Cl.
CPC ......... *F03D 7/0264* (2013.01); *F03D 7/0296* (2013.01); *F05B 2260/74* (2013.01); *F05B 2260/85* (2013.01); *F05B 2260/90* (2013.01); *F05B 2270/1095* (2013.01); *F05B 2270/111* (2013.01); *F05B 2270/32* (2013.01); *F05B 2270/327* (2013.01); *F05B 2270/328* (2013.01); *F05B 2270/335* (2013.01); *Y02E 10/723* (2013.01)

(56) References Cited

U.S. PATENT DOCUMENTS

| | | | | |
|---|---|---|---|---|
| 10,138,866 | B2* | 11/2018 | Ohya | ................... F03B 13/26 |
| 2003/0170123 | A1 | 9/2003 | Heronemus | |
| 2005/0218656 | A1 | 10/2005 | Wobben | |
| 2009/0184519 | A1* | 7/2009 | Nies | ................... F03D 7/0224 |
| | | | | 290/44 |
| 2009/0196748 | A1* | 8/2009 | Salter | ................... F03D 1/02 |
| | | | | 416/120 |
| 2009/0311099 | A1* | 12/2009 | Richards | ............... F03D 1/0608 |
| | | | | 416/120 |
| 2011/0025059 | A1* | 2/2011 | Helle | ................... F03D 7/0224 |
| | | | | 290/44 |
| 2012/0267895 | A1* | 10/2012 | Blaxland | ................... F03D 1/02 |
| | | | | 290/54 |
| 2013/0127173 | A1 | 5/2013 | Lee et al. | |
| 2019/0093630 | A1* | 3/2019 | Grunnet | ................ F03D 7/0296 |

FOREIGN PATENT DOCUMENTS

| | | |
|---|---|---|
| DE | 4413688 A1 | 10/1995 |
| EP | 2327875 A1 | 6/2011 |
| GB | 2443886 A | 5/2008 |
| JP | 2005351087 A | 12/2005 |
| WO | 2017108047 A1 | 6/2017 |

OTHER PUBLICATIONS

PCT International Search Report for Application No. PCT/DK2016/050427, dated Dec. 12, 2016.

Mark Cardinal et al.: 11 Grid Friendly Wind Power Plants: Windeontrol(TM)—Field Test results 11 , Wi Nd Power, Jun. 1, 2006 (Jun. 1, 2006), pp. 1-8, XP055266021, the whole document.

Danish Patent and Trademark Office Search and Exam Report for Application No. 2015 70849 dated Jul. 4, 2016.

PCT Written Opinion of the International Searching Authority for Application No. PCT/DK2016/050427 dated Dec. 12, 2016.

* cited by examiner

WIND TURBINE SYSTEM WITH TIME DISTRIBUTED TRANSITIONS

FIELD OF THE INVENTION

The present invention relates to a wind turbine system, more particularly a wind turbine system with a plurality of wind turbine modules wherein the plurality of wind turbine module may change operational state at different points in time with respect to each other and a corresponding method, computer program product and control system.

BACKGROUND OF THE INVENTION

A wind turbine system with a plurality of wind turbine modules mounted to a support structure may be subjected to a significant structural load exerted by the wind turbine modules, in particular during transitions between system operational states, which significant structural loads may reduce the lifetime of the wind turbine system.

Hence, an improved wind turbine system would be advantageous, and in particular a wind turbine system enabling reducing the structural load exerted by the wind turbine modules and/or enabling increasing the lifetime of the wind turbine system.

GB 2443886 discloses a wind turbine system of the multi-rotor type.

SUMMARY OF THE INVENTION

It may be seen as an object of the present invention to provide a wind turbine system that solves the above mentioned problems with structural load exerted by the wind turbine modules and the reduction in life time of the wind turbine system.

The above described object is intended to be obtained in a first aspect of the invention by providing a wind turbine system, wherein the wind turbine system is comprising:
  A support structure,
  a plurality of wind turbine modules mounted to the support structure wherein each of the plurality of wind turbine modules comprises a rotor,
  a control system,
  wherein the control system is arranged to execute a wind turbine system transition from a first system operational state of the wind turbine system to a second system operational state of the wind turbine system, and wherein the wind turbine system transition is performed by executing a plurality of wind turbine module transitions from a first module operational state of a wind turbine module to a second module operational state of the wind turbine module wherein the plurality of wind turbine module transitions are distributed in time with respect to each other.

The invention is particularly, but not exclusively, advantageous for obtaining a wind turbine system which may enable reducing the structural load, such as the maximum structural load (which may be referred to as peak structural load), exerted by the wind turbine modules during transitions between system operational states and/or which may enable increasing the lifetime of the wind turbine system.

The peak structural load exerted by the wind turbine modules during transitions between system operational states entails demanding requirements on the support structure and reduces lifetime of the wind turbine system. It is an advantage of embodiments of the present invention that this peak structural load can be reduced by arranging the wind turbine module transitions so that the plurality of wind turbine module transitions are distributed in time with respect to each other. By having the wind turbine module transitions so that the plurality of wind turbine module transitions are distributed in time with respect to each other, it is avoided that they are all co-incident in time and instead they become distributed in time, which in turn entails that the structural loads associated with the plurality of wind turbine module transitions become distributed in time. In other words, the wind turbine module transitions within the plurality of wind turbine module transitions are distributed in time with respect to each other so that a maximum wind turbine system transition generated structural load on the support structure is reduced with respect to a wind turbine system transition with the plurality of wind turbine module transitions being simultaneous.

By 'the plurality of wind turbine module transitions are distributed in time with respect to each other' may be understood that two or more or all of the wind turbine module transitions within the plurality of wind turbine module transitions are distributed in time with respect to each other, such as being non-coincident in time.

In situations, the individual wind turbine module transitions may last for a finite period of time. The point in time during a wind turbine module transition where the structural load exerted by the wind turbine module on the support structure is maximum defines the point in time of that wind turbine module transition, even if that wind turbine module transition lasts for a finite period of time. It is noted that wind turbine module transitions for different modules lasting a finite period of time may be partially or fully overlapping and still be considered distributed in time as long as there is not identity between points in time where the structural loads exerted by the respective wind turbine modules on the support structure are maximum.

By 'structural load' may in general be understood any influence, such as a force, on a structural component that can cause wear and/or failure.

In a second aspect, the invention relates to a method for executing a wind turbine system transition from a first system operational state of a wind turbine system to a second system operational state of the wind turbine system, wherein the wind turbine system is comprising a plurality of wind turbine modules mounted to a support structure,
  said method comprising executing said wind turbine system transition by executing a plurality of wind turbine module transitions from a first operational module state of a wind turbine module to a second operational module state of the wind turbine module,
  wherein the plurality of wind turbine module transitions are distributed in time with respect to each other.

In a third aspect, the invention relates to a computer program product having instructions which, when executed cause a computing device or a computing system, such as a control system, to perform a method according the second aspect.

In a fourth aspect, the invention relates to control system for controlling a wind turbine system, said control system being arranged for controlling said wind turbine system according to a method according to the second aspect.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DESCRIPTION OF EMBODIMENTS

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
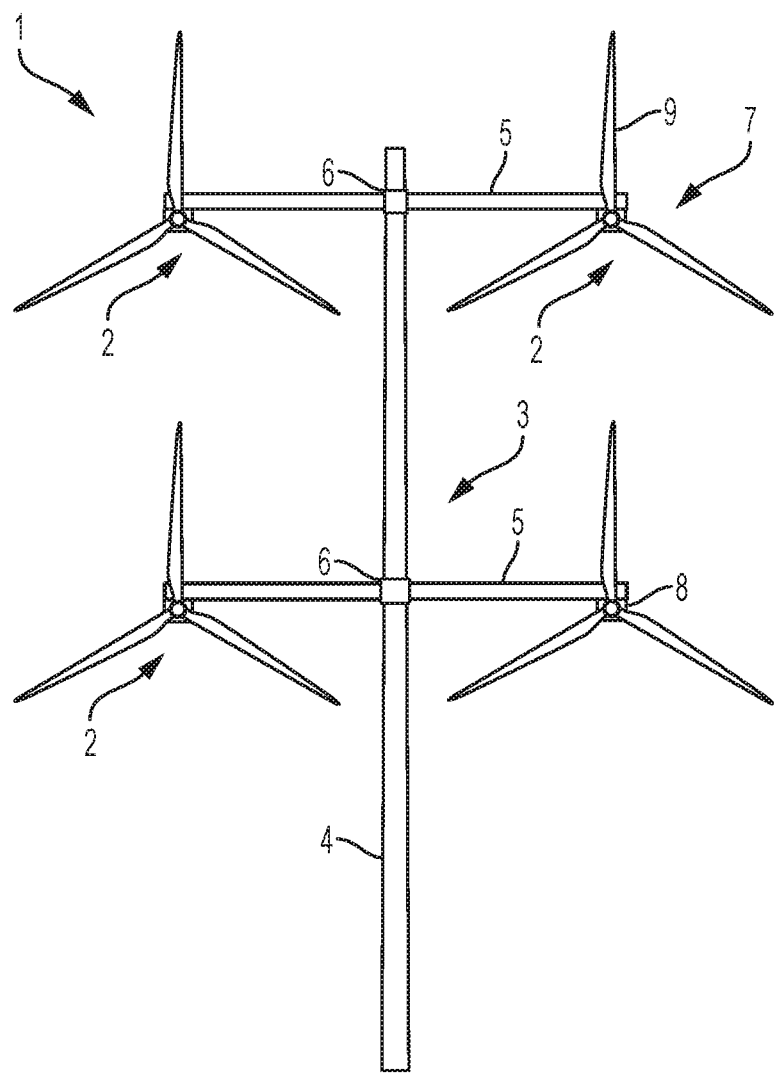
FIG. 1 depicts a wind turbine system.

FIG. 1 depicts a wind turbine system 1, wherein the wind turbine system is comprising:

- A support structure 3 including a tower 4 and arms 5 mounted to the tower 4 at junctions 6,
- a plurality of wind turbine modules 2 mounted to the support structure 3 wherein each of the plurality of wind turbine modules comprises a rotor 7 with blades 9.

Figure 2:
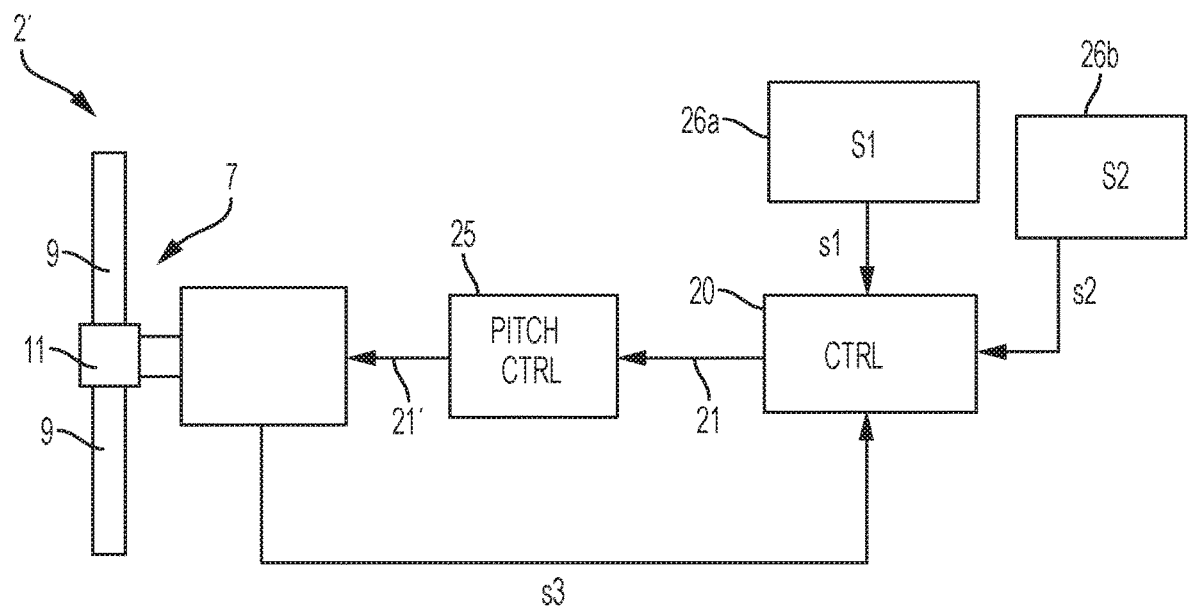
FIG. 2 shows a part of a wind turbine system.

The wind turbine system further comprises a control system 20 as shown in FIG. 2. The control system 20 is arranged to execute a wind turbine system transition from a first system operational state of the wind turbine system 1 to a second system operational state of the wind turbine system 1, and wherein the wind turbine system transition is performed by executing a plurality of wind turbine module transitions from a first module operational state of a wind turbine module 2 to a second module operational state of the wind turbine module 2 wherein the plurality of wind turbine module transitions are distributed in time with respect to each other.

In the present embodiment the support structure comprises arms 5 extending outwards from the tower 4, each of the plurality of wind turbines being mounted on an end part of a corresponding arm. Furthermore, FIG. 1 depicts a nacelle 8 for each wind turbine module.

FIG. 1 shows a support structure with two arms each having two wind turbine modules, but other embodiments are conceivable, e.g., four arms with four wind turbine modules each or three arms with lower, middle and upper arm, respectively having six, four and two wind turbine modules.

FIG. 2 shows a part of a wind turbine system wherein the control system 20 is arranged for pitching blades 9 on the rotors 7 (where each rotor 7 comprises a hub 11 which blades 9 are attached to) during the plurality of wind turbine module transitions, wherein blade pitch rates corresponding to at least two rotors, such as the depicted particular wind turbine module 2', within the plurality of rotors are different with respect to each other, and wherein the difference in blade pitch rates entails that the plurality of wind turbine module transitions are distributed in time with respect to each other.

By 'blade pitch rate' is generally understood that rate at which all blades of a wind turbine module are pitched. This is also known as 'collective blade pitch rate'.

In embodiments, collective blade pitch rates (each corresponding to a blade pitch rate for a particular wind turbine module, where the blade pitch rate applies to all blades of the particular wind turbine module) may be different with respect to each other, i.e., the collective pitch rates for the individual wind turbine modules are different with respect to each other (i.e., different between wind turbine modules).

The blade pitch rate for a particular wind turbine module 2' may be determined by the control system 20 based on one or more further input parameters, such as wind speed s1 from a first sensor arrangement 26a being an anemometer associated with the particular wind turbine module 2' arranged for measuring wind speed s1 and thrust s2 from a second sensor arrangement 26b being a sensor arrangement for measuring rotor speed of the particular wind turbine module 2'. The blade pitch rate may then be controlled via a first pitch control signal 21 to pitch controller 25, which in turn sends a second pitch control signal 21' to the rotor 7. The control system 20 may also take information regarding the rotor 7 into account, e.g., rotor speed s3.

Figure 4:
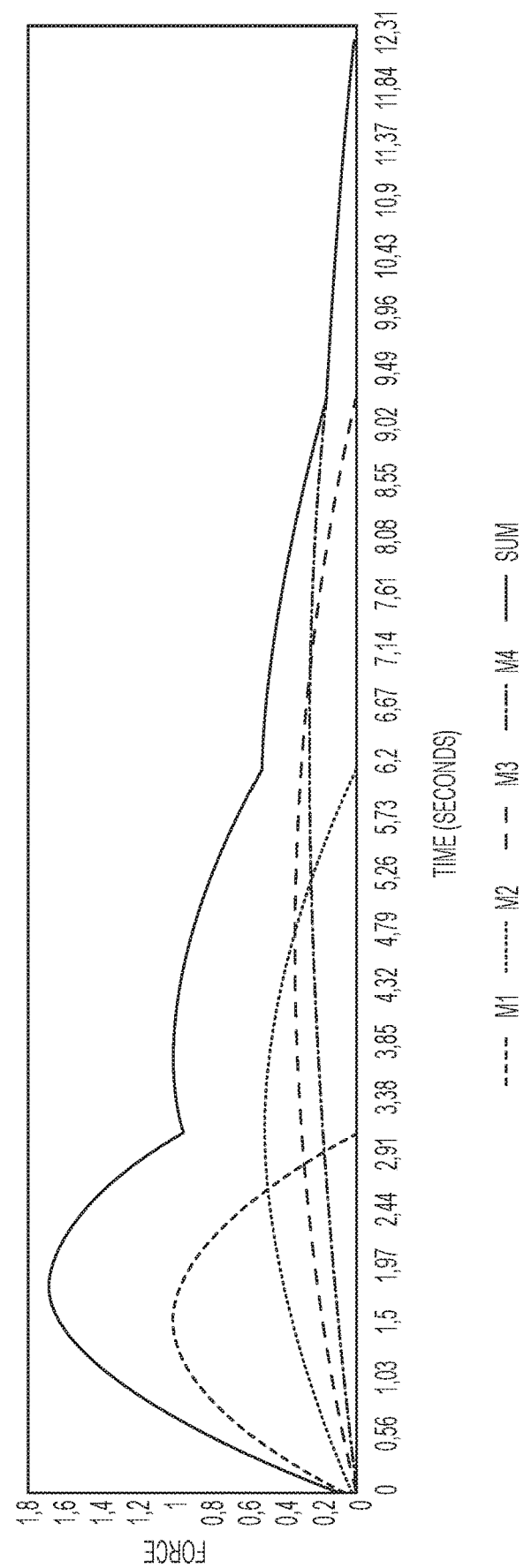
FIG. 4 is an illustration of an effect of having different blade pitch rates.

FIG. 4 is an illustration of an effect of having different blade pitch rates for the four different wind turbine modules (here denoted M1-M4) during a wind turbine system transition from a first system operational state of the wind turbine system to a second system operational state of the wind turbine system. The illustration shows a graph with structural load exerted by the wind turbine modules M1-M4 on the support structure 3 on the vertical axis and time on the horizontal axis. In this example, all wind turbine module transitions are initiated at the same time, at time t=0 seconds. However, due to the difference in blade pitch rates, the wind turbine module transitions are not equally fast and the points in time during the finite period of time corresponding to the wind turbine module transitions where the structural loads exerted by the wind turbine modules on the support structure are maximum becomes distributed in time with respect to each other. Thus, the maximum structural load by the sum of the structural loads exerted by the individual wind turbine modules is relatively low (compared to a situation where the plurality of wind turbine module transitions being simultaneous).

Figure 5:
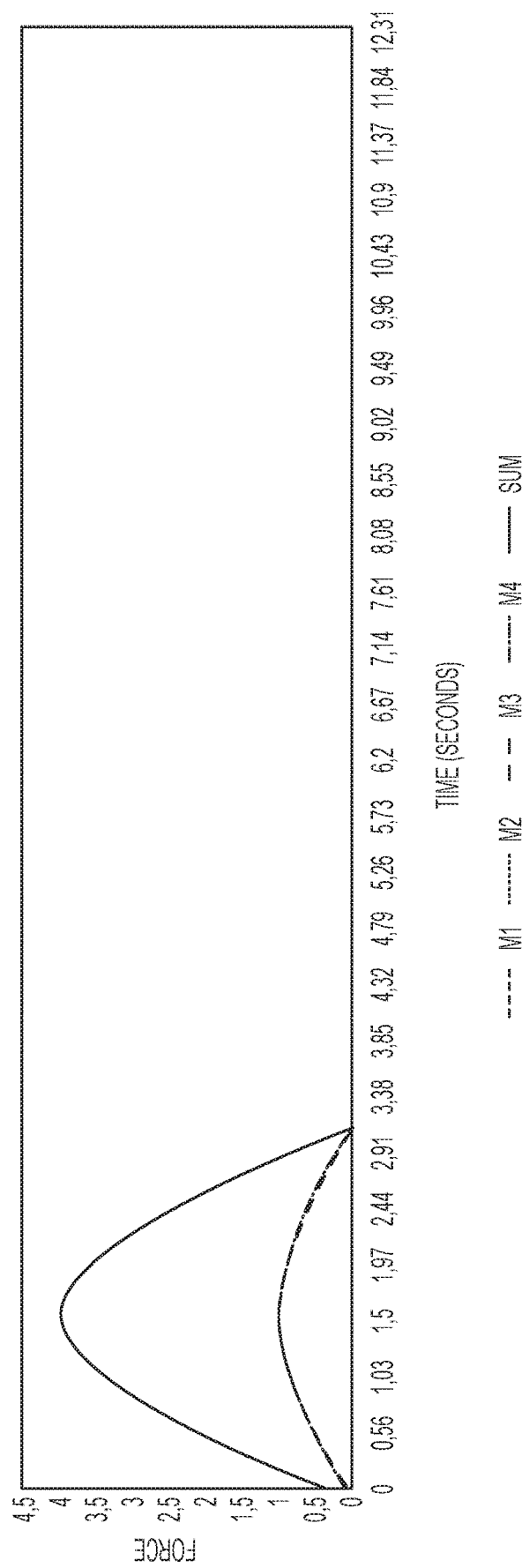
FIG. 5 shows a wind turbine system transition with the plurality of wind turbine module transitions being simultaneous.

FIG. 5 shows for comparison an example of a wind turbine system transition with the plurality of wind turbine module transitions being simultaneous, in which case the maximum sum structural load becomes relatively high (compared to a situation where the plurality of wind turbine module transitions are distributed in time with respect to each other).

In an embodiment the control system 20 is arranged for initiating wind turbine module transitions corresponding to at least two wind turbine modules within the plurality of wind turbine modules at initiation points in time, wherein the initiation points in time corresponding to the at least two wind turbine modules are different with respect to each other, and wherein the difference in initiation points in time entails that the plurality of wind turbine module transitions are distributed in time with respect to each other.

Figure 6:
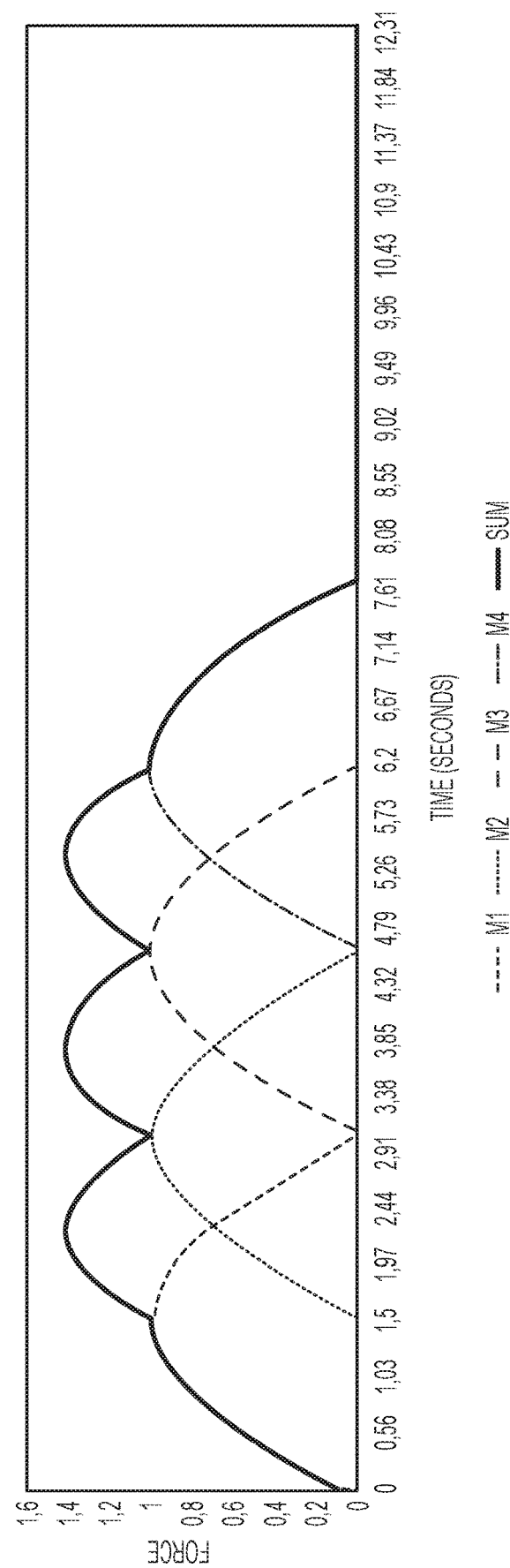
FIG. 6 is an illustration of an effect of having different initiation points in time.

FIG. 6 is an illustration of an effect of having initiation points in time corresponding to the four different wind turbine modules (here denoted M1-M4) which are different with respect to each other. The illustration shows a graph with structural load exerted by the wind turbine modules M1-M4 on the support structure 3 on the vertical axis and time on the horizontal axis. In this example, all wind turbine module transitions are initiated at different initiation points in time, each separated approximately 1½ minute from the preceding and/or the subsequent initiation point in time. However, all blade pitch rates are identical. Due to the difference in initiation points in time, the points in time during the finite period of time corresponding to the wind turbine module transitions where the structural loads exerted by the wind turbine modules on the support structure are maximum becomes distributed in time with respect to each other. Thus, the maximum structural load by the sum of the structural loads exerted by the individual wind turbine modules is relatively low (compared to a situation where the plurality of wind turbine module transitions being simultaneous).

In an embodiment a first blade pitch rate corresponding to a first group of rotors comprising two or more rotors is different with respect to a second blade pitch rate corresponding to a second group of rotors comprising two or more rotors.

In an embodiment a first initiation point in time corresponding to a first group of wind turbine modules comprising two or more wind turbine modules is different with respect to a second initiation point in time corresponding to a second group of wind turbine modules comprising two or more wind turbine modules.

An advantage of having a similar blade pitch rate or a similar initiation point within pairs or groups of rotors or wind turbine modules may be that it enables balancing structural loads on two sides of the tower 4 in a simple an efficient manner.

In embodiments, all initiation points in time (each corresponding to an initiation point for a wind turbine module) may be different with respect to each other.

In an embodiment the control system 20 is arranged to control electrical connection of one or more of the wind turbine modules within the plurality of wind turbine modules to dump load resistors during a wind turbine system transition. An advantage of this may be that the dump load resistor can ensure a torque on the rotor of a particular wind turbine module during, e.g., a grid failure, which torque may enable that the other wind turbine modules can be shut down immediately while the particular wind turbine module can be kept running for some time with the torque applied via the dump load resistor (which ensures that the rotor does not achieve an undesirably high rotor speed).

In an embodiment, a conventional load dump arrangement usable in a wind turbine (such as is described in FIG. 2 and paragraphs 51-52 of the patent application WO 2012/000508 which figure and paragraphs are hereby incorporated by reference) is employed. The wind turbine includes a generator, an AC (alternating current)-to-DC (direct current) power converter (generator-side converter), a DC-to-AC power converter (line-side converter), and a DC link comprising a DC capacitor connected between the AC-to-DC power converter and the DC-to-AC power converter. The generator of the wind turbine is connected to the AC-to-DC power converter. The DC-to-AC power converter is connected to a power grid via a transformer. A first load dump of the load dump arrangement is connected to output terminals of the generator, corresponding to a 3-phase AC output of the generator. The first load dump can be called as AC load dump. The first load dump may be a three-phase load dump which is essentially a three phase resistor bank.

A second load dump of the load dump arrangement is connected across the DC link. The second load dump can be called as DC load dump.

In an embodiment one or more of the wind turbine modules within the plurality of wind turbine modules each comprises a mechanical rotor brake and wherein the control system 20 is arranged to brake one or more or all of said one or more wind turbine modules via the one or more mechanical rotor brakes during a wind turbine system transition. An advantage of this may be that a mechanical rotor brake, in particular for relatively small wind turbine modules, can ensure a torque on the rotor of a particular wind turbine module during, e.g., a grid failure, which torque may enable that the plurality of wind turbine module transitions are distributed in time with respect to each other, even if the corresponding transitions (e.g., where said transitions are shutdown procedures) are initiated at initiation points in time which are identical.

Having one or more mechanical rotor brakes and/or different blade pitch rates may be particularly useful in case of grid loss, fault stop or safety stop wherein a shutdown must be initiated for all wind turbine modules within a short period of time, such as within 1 second or less, because the mechanical brakes and/or the difference in blade pitch rates entails that the plurality of wind turbine module transitions are distributed in time with respect to each other.

In an embodiment the control system 20 is arranged for initiating wind turbine module transitions corresponding to at least two wind turbine modules within the plurality of wind turbine modules at initiation points in time, wherein the initiation points in time corresponding to the at least two, such as more than two such as all, wind turbine modules are identical, and wherein a difference in time period from initiation point in time to transition point in time between individual wind turbine modules entails that the plurality of wind turbine module transitions are distributed in time with respect to each other.

The control system 20 may be arranged to determine a sequence of wind turbine module transitions, such as a temporal position of each wind turbine module transition with respect to temporal positions of other wind turbine module transitions, according to one or more further input parameters. A possible advantage of this may be that an improved sequence may be provided.

The one or more further input parameters may comprise or correspond to one or more or all of:

Operating point of the respective wind turbine modules,
physical position of the respective wind turbine modules,
wind speed at the respective wind turbine modules,
rotor speed at the respective wind turbine modules,
blade pitch value of the respective wind turbine modules,
power produced by the respective wind turbine modules,
thrust of the respective wind turbine modules,
rotor torque of the respective wind turbine modules.

For example, the control system 20 may be operated to arrange a temporal position of a wind turbine module transition with respect to temporal positions of other wind turbine module transitions based on a physical position of the wind turbine module with respect to physical positions of the other wind turbine modules.

In general, the sequence may be determined with a view to minimize structural loads on the support structure. For example, during a system transition corresponding to a shutdown, the sequence may be determined by the structural load exerted on the support structure by the individual wind turbine modules (e.g., a wind turbine module at a position high above the ground with a large thrust may exert more torque on the tower of the support structure than a wind turbine module at a position close to the ground with a small thrust), where higher structural loads means earlier shutdown. However, certain boundary conditions may be taken into account, e.g., the structural loads on the wind turbine modules. For example, even if a wind turbine module exerts only a small structural load on the support structure, it may be moved forward in a shutdown sequence if, e.g., its rotor speed is so fast that it significantly increases the likelihood of an overspeed.

The wind turbine system transition from the first system operational state of the wind turbine system to the second system operational state of the wind turbine system may correspond to any one of a start-up procedure of the wind turbine system or a shutdown procedure of the wind turbine system.

In an embodiment a period of time between at least two, such as more or all, wind turbine module transitions within the plurality of wind turbine module transitions is 1 second or more, such as 2 seconds or more, such as 5 seconds or more, such as 10 seconds or more, such as 15 seconds or more, such as 30 seconds or more, such as 1 minute or more, such as 2 minutes or more, such as 5 minutes or more, such as 10 minutes or more, such as 15 minutes or more, such as 30 minutes or more, such as 1 hour or more.

In an embodiment a period of time between at least two, such as more or all, wind turbine module transitions within the plurality of wind turbine module transitions is 30 seconds or less, such as 20 seconds or less, such as 10 seconds or less, such as 5 seconds or less, such as 3 seconds or less, such as 2 seconds or less, such as 1 second or less, such as within 0.1-1 second.

In an embodiment a period of time between at least two, such as more or all, wind turbine module transitions within the plurality of wind turbine module transitions is within 0.1-30 seconds, such as within 1-30 seconds, such as within 2-20 seconds, such as within 5-15 seconds. Such intervals may be advantageous in case of a grid loss, a stop during and/or after a fault or a safety stop.

In an embodiment a period of time between at least two, such as more or all, wind turbine module transitions within the plurality of wind turbine module transitions is within 30 seconds to 30 minutes, such as within 1-20 minutes or 10-20 minutes or 15-20 minutes, such as within 2-10 minutes, such as within 2-5 minutes. Such intervals may be advantageous in case of a normal start up or shutdown procedure.

Figure 3:
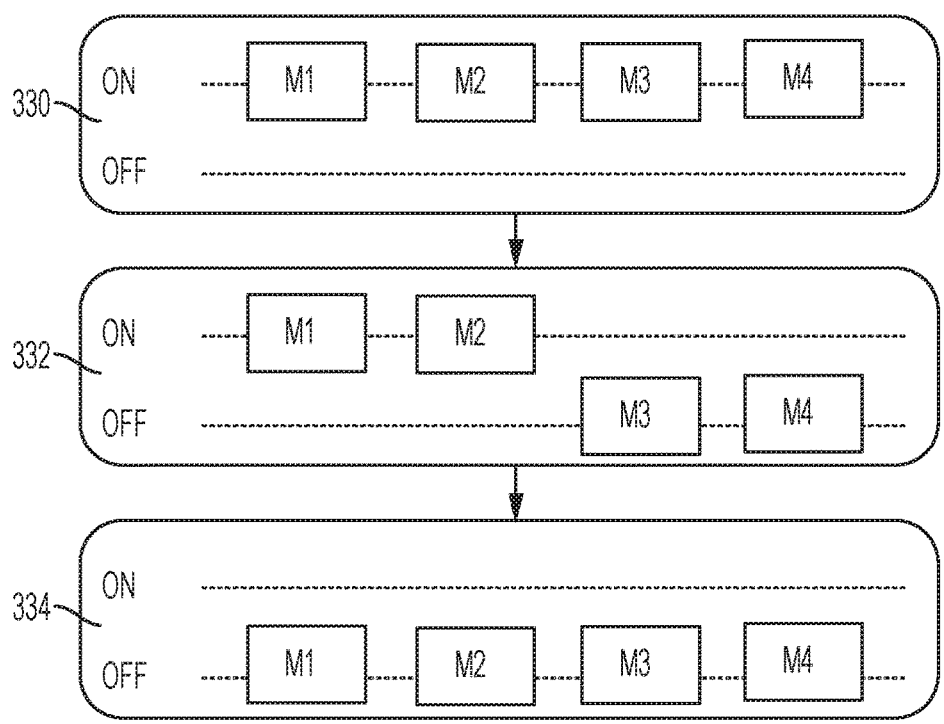
FIG. 3 shows a method for executing a wind turbine system transition.

FIG. 3 shows a method for executing a wind turbine system transition from a first system operational state 330 of a wind turbine system 1 to a second system operational state 334 of the wind turbine system, wherein the wind turbine system is comprising a plurality of wind turbine modules M1, M2, M3, M4 mounted to a support structure 3, said method comprising executing said wind turbine system transition by executing a plurality of wind turbine module transitions from a first operational module state (ON) of a wind turbine module 2 to a second operational module state (OFF) of the wind turbine module 2, wherein the plurality of wind turbine module transitions are distributed in time with respect to each other. The figure shows a shutdown procedure, where in the first system operational state 330 of a wind turbine system, all wind turbine modules M1, M2, M3, M4 are ON. Then in an intermediate system operational state 332 of the wind turbine system two wind turbine module transitions from a first operational module state (ON) of wind turbine modules M3 and M4 to a second operational module state (OFF) of the wind turbine modules have been executed. Then, subsequently, the wind turbine system is shown in a second system operational state 334 of the wind turbine system where another two wind turbine module transitions from a first operational module state (ON) of wind turbine modules M1 and M2 to a second operational module state (OFF) of the wind turbine modules have been executed.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wind turbine system, comprising:
a support structure;
a plurality of wind turbine modules mounted to the support structure wherein each of the plurality of wind turbine modules comprises a rotor;
a control system configured to:
execute one or more transitions between system operational states of the plurality of wind turbine modules,
wherein the system operational states comprise a start-up procedure and a shutdown procedure of the wind turbine system, and
wherein a second wind turbine module of the plurality of wind turbine modules transitions between the system operation states based on when a first wind turbine module of the plurality of wind turbine modules transitions between the system operation states.

2. The wind turbine system of claim 1, wherein the control system is further configured to execute the one or more transitions by changing one or more blade pitches of the first wind turbine module or the second wind turbine module.

3. The wind turbine system of claim 2, wherein a first blade pitch rate corresponding to a first group of wind turbine modules differs from a second blade pitch rate corresponding to a second group of wind turbine modules.

4. The wind turbine system of claim 1, wherein the control system is further configured to initiate wind turbine module transitions corresponding to at least two wind turbine modules of the plurality of wind turbine modules at different points in time.

5. The wind turbine system of claim 1, wherein the control system is further configured to control an electrical connection between one or more of the plurality of wind turbine modules and one or more dump load resistors during the one or more transitions between system operational states.

6. The wind turbine system of claim 1, wherein each of the plurality of wind turbine modules comprises a mechanical rotor brake, and wherein the control system is further configured to execute the one or more transitions by implementing the mechanical rotor brake.

7. The wind turbine system of claim 1, wherein the control system is further configured to execute the one or more transitions by sequencing the one or more transitions based on one or more input parameters.

8. The wind turbine system of claim 7, wherein the one or more input parameters comprise at least one of:
operating point of the respective wind turbine modules,
physical position of the respective wind turbine modules,
wind speed at the respective wind turbine modules,
rotor speed at the respective wind turbine modules,
blade pitch value of the respective wind turbine modules,
power produced by the respective wind turbine modules,
thrust of the respective wind turbine modules, and
rotor torque of the respective wind turbine modules.

9. The wind turbine system of claim 1, wherein a period of time between the one or more transitions is at least 1 second.

10. The wind turbine system of claim 1, wherein a period of time between the one or more transitions is between 0.1-30 seconds.

11. The wind turbine system of claim 1, wherein a period of time between the one or more transitions is between 30 seconds to 30 minutes.

12. Computer program product having instructions which, when executed by one or more processors perform an operation for controlling a wind turbine system comprising a plurality of wind turbine modules mounted to a support structure, the operation comprising:
executing one or more transitions between system operational states of the plurality of wind turbine modules,
wherein the system operational states comprise a start-up procedure and a shutdown procedure of the wind turbine system; and
wherein a second wind turbine module of the plurality of wind turbine modules transitions between the system operation states based on when a first wind turbine module of the plurality of wind turbine modules transitions between the system operation states.

13. A method for controlling a wind turbine system including a plurality of wind turbine modules disposed on a common support structure, the method comprising:
executing a transition between system operational states of a plurality of wind turbine modules,
wherein the system operational states comprise a start-up procedure and a shutdown procedure of the wind turbine system; and
wherein a second wind turbine module of the plurality of wind turbine modules transitions between the system operation states based on when a first wind turbine module of the plurality of wind turbine modules transitions between the system operation states.

* * * * *